(12) United States Patent
Kimura et al.

(10) Patent No.: US 7,108,530 B2
(45) Date of Patent: Sep. 19, 2006

(54) CARD FITTING MECHANISM HAVING A PLURALITY OF CARD RECEIVING PORTIONS AND YET CAPABLE OF BEING REDUCED IN SIZE

(75) Inventors: Akira Kimura, Tokyo (JP); Kazushi Kamata, Aomori (JP); Nobukazu Kato, Tokyo (JP); Tomohiko Tamada, Tokyo (JP)

(73) Assignees: Japan Aviation Electronics Industry, Limited, Tokyo (JP); JAE Hirosaki, Ltd., Hirosaki (JP)

( * ) Notice: Subject to any disclaimer, the term of this patent is extended or adjusted under 35 U.S.C. 154(b) by 0 days.

(21) Appl. No.: 10/930,396

(22) Filed: Aug. 31, 2004

(65) Prior Publication Data

US 2005/0048833 A1 Mar. 3, 2005

(30) Foreign Application Priority Data

Sep. 3, 2003 (JP) ............................. 2003-311703

(51) Int. Cl.
*H01R 27/00* (2006.01)
(52) U.S. Cl. ...................................... 439/218; 361/755
(58) Field of Classification Search ................ 439/218, 439/64, 377, 924.2; 361/755–756, 737, 736, 361/802, 686, 684, 685
See application file for complete search history.

(56) References Cited

U.S. PATENT DOCUMENTS

| 5,017,147 A | * | 5/1991 | Sugiyama et al. ............ 439/144 |
| 5,848,906 A | * | 12/1998 | Glusker et al. ............. 439/157 |
| 6,419,499 B1 | * | 7/2002 | Bundza ....................... 439/61 |
| 6,483,717 B1 | * | 11/2002 | Ives et al. .................... 361/801 |
| 6,814,606 B1 | * | 11/2004 | Kobayashi ................... 439/372 |

FOREIGN PATENT DOCUMENTS

| JP | 2002-329178 | 11/2002 |
| JP | 8007047 | 9/2003 |
| JP | 2002-318511 | 11/2004 |

* cited by examiner

*Primary Examiner*—Phuong Dinh
(74) *Attorney, Agent, or Firm*—Collard & Roe, P.C.

(57) ABSTRACT

In a card fitting mechanism for receiving a card fitted thereto, a plurality of card receiving portions are arranged parallel to one another. Each of the card receiving portions is adapted to receive the card. A guiding member is disposed between adjacent ones of the card receiving portions so as to enter into adjacent ones of the card receiving portions. When the card is inserted in only one of the adjacent card receiving portions, the guiding member is moved by the card to serve as a guide for guiding the card that is inserted into another of the adjacent card receiving portions.

7 Claims, 8 Drawing Sheets

CARD FITTING MECHANISM HAVING A PLURALITY OF CARD RECEIVING PORTIONS AND YET CAPABLE OF BEING REDUCED IN SIZE

This application claims priority to prior Japanese patent application JP 2003-311703, the disclosure of which is incorporated herein by reference.

BACKGROUND OF THE INVENTION

This invention relates to a card fitting mechanism for use in an electronic apparatus adapted to receive a plurality of cards fitted or set thereto.

An electronic apparatus of the type is disclosed, for example, in Japanese Patent Application Publication (JP-A) No. H8-7047 and comprises a housing and a card fitting mechanism incorporated into the housing. The card fitting mechanism has a plurality of card fitting plates arranged on a predetermined plane and adjacent to one another in a first direction. Each of the card fitting plates has a pair of guide walls formed on opposite sides in the first direction to guide opposite side surfaces of a card. The card is inserted in a second direction perpendicular to the first direction to a space between the guide walls of the card fitting plate. Thus, the card is easily inserted into and removed from the space on the card fitting plate.

However, each of the card fitting plates has the guide walls. This structure requires a large additional space and is not suitable for a small-sized electronic apparatus.

In case where a connector to be connected to the cards fitted to the electronic apparatus is combined with the card fitting mechanism, various problems, such as a recognition error, a mounting error, a soldering defect after reflow soldering, tend to frequently occur as an external dimension is greater.

SUMMARY OF THE INVENTION

It is therefore an object of the present invention to provide a card fitting mechanism having a plurality of card receiving portions and yet capable of being reduced in size.

It is another object of the present invention to provide a card fitting mechanism capable of improving an operability upon inserting a plurality of cards into a plurality of card receiving portions.

It is still another object of the present invention to provide a card fitting mechanism capable of preventing an insertion error even in a case where plural cards are inserted.

It is yet another object of the present invention to provide a card fitting mechanism capable of achieving high-density mounting without increasing an external dimension.

Other objects of the present invention will become clear as the description proceeds.

According to an aspect of the present invention, there is provided a card fitting mechanism for receiving a card fitted thereto, the card fitting mechanism comprising a plurality of card receiving portions arranged parallel to one another, each of the card receiving portions being adapted to receive the card, and a guiding member disposed between adjacent ones of the card receiving portions so as to enter into adjacent ones of the card receiving portions, the guiding member being moved by insertion of the card into only one of the adjacent ones to serve as a guide for guiding insertion of the card into another of the adjacent ones.

DESCRIPTION OF PREFERRED EMBODIMENT

Figure 1:
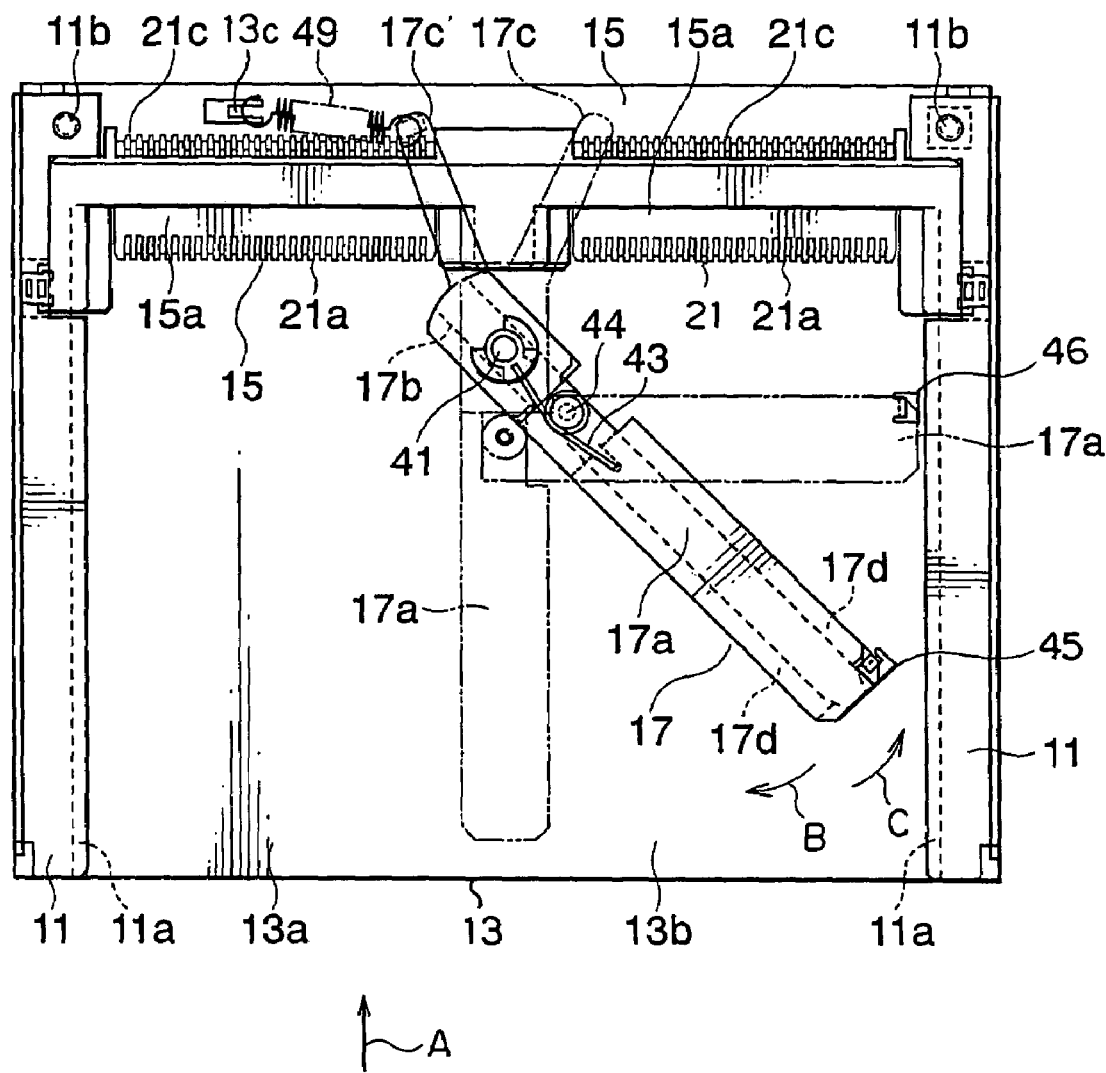
FIG. 1 is a plan view of a card fitting mechanism according to an embodiment of the present invention.

Referring to FIGS. 1 to 4, a card fitting mechanism according to an embodiment of the present invention will be described.

The card fitting mechanism illustrated in the figure is adapted for receiving or setting cards 31 each having a plate-like shape, such as an IC card, and comprises a pair of guide frames 11 arranged in parallel to each other with a predetermined space, a base plate 13 supporting the guide frames 11 on its upper surface, a connector 15 having opposite ends held between ends of the guide frames 11, and a guiding member 17 disposed on the base plate 13 between the guide frames 11.

Figure 2:
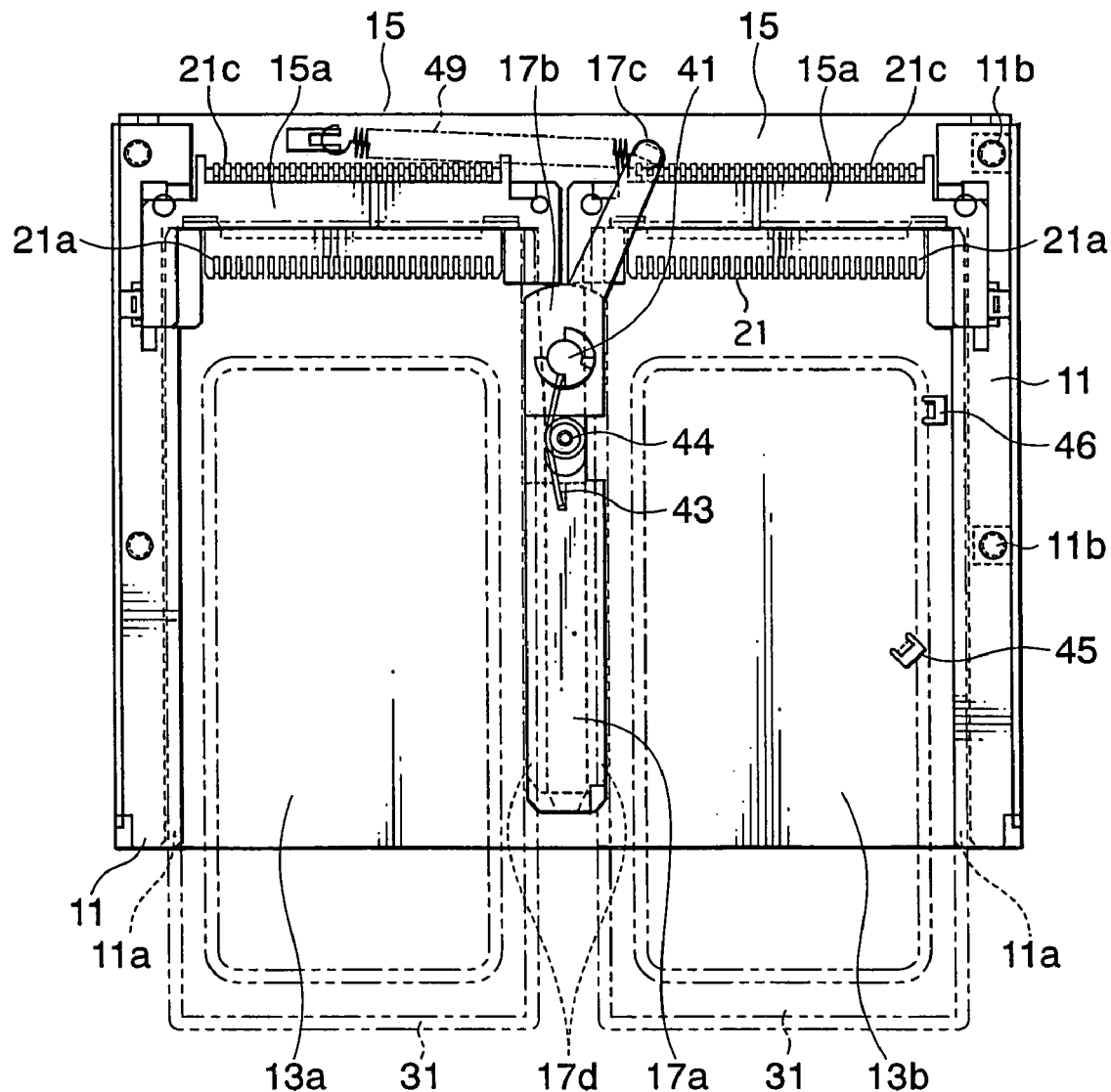
FIG. 2 is a plan view of the card fitting mechanism in FIG. 1 with a plurality of cards inserted therein.
Figure 3:
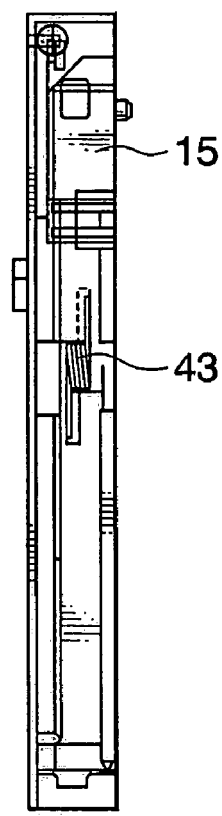
FIG. 3 is a right side view of the card fitting mechanism in FIG. 1.
Figure 4:
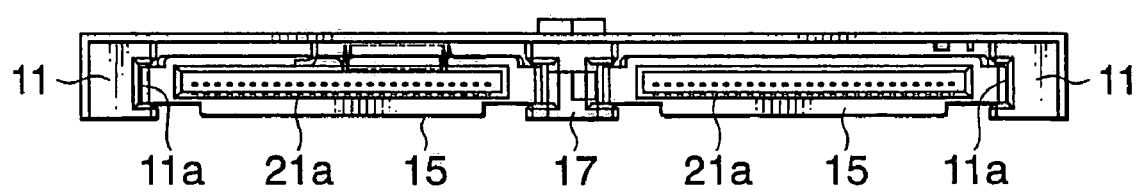
FIG. 4 is a front view of the card fitting mechanism in FIG. 2.

The base plate 13 is mounted to an electronic apparatus (not shown). Specifically, the base plate 13 is fixed to a printed circuit board (not shown) mounted to the electronic apparatus by inserting screws into screw holes 11b formed on the guide frames 11, respectively. An upper space defined on the base plate 13 is separated by the guiding member 17 between the guide frames 11 into a first card receiving portion 13a and a second card receiving portion 13b. Onto the upper surface of the base plate 13, the cards 31 are fitted with sliding movement in a predetermined sliding direction, i.e., a first direction A. Thus, the cards 31 are fitted to the first and the second card receiving portions 13a and 13b along the upper surface of the base plate 13. In FIG. 2, the cards 31 are identical in shape and size and fitted in parallel to each other on left and right sides in the figure as depicted by imaginary lines.

The connector 15 comprises an insulator 15a and a plurality of conductive contacts 21 held in the insulator 15a. Each of the contacts 21 has a contacting portion 21a to be contacted with a card-side contacting portions (not shown) of the card 31, a holding portion (not shown) held by the insulator 15a, and a terminal portion 21c extending from the holding portion to the outside of the insulator 15a. The terminal portion 21c is connected by soldering to a conductive portion formed on the above-mentioned printed circuit board. Since the connector 15 for connecting the card 31 is provided, the card fitting mechanism may be called a card connector.

The guiding member 17 is located at a generally intermediate position between the first and the second card receiving portions 13a and 13b and rotatably supported on the base plate 13 through a shaft portion 41. The guiding member 17 has a first guide portion 17a and a second guide portion 17b connected to the first guide portion 17a. Namely, the guiding member 17 is designed as an assembly comprising a plurality of parts. The second guide portion 17b is provided with a connecting shaft portion 44 extending in a direction perpendicular to the base plate 13. To the connecting shaft portion 44, the first guide portion 17a and a first spring member 43 are rotatably fixed. The first and the second guide portions 17a and 17b are urged by the spring member 43 to be aligned in a single straight line. Thus, the first guide portion 17a is rotatable with respect to the second guide portion 17b. Normally, the first and the second guide portions 17a and 17b are aligned along a single straight line under urging force of the spring member 43.

The second guide portion 17b is supported by the shaft portion 41 of the base plate 13 to be rotatable in second and third directions B and C. The second guide portion 17b has an extended portion extending to a rear side of the connector 15 and provided with a spring fixing portion 17c. The spring fixing portion 17c is engaged with one of hooks of a second spring member, namely, a tension coil spring 49. The other hook of the tension coil spring 49 is engaged with an engaging part 13c of the base plate 13. Thus, the guiding member 17 is urged in the third direction C around the shaft portion 41. As a consequence, in an uninserted state where the cards 31 are not inserted into the first and the second card receiving portions 13a and 13b as illustrated in FIG. 1, the guiding member 17 is rotated in the third direction C around the shaft portion 41 and located at a right-hand position in the figure. Therefore, the first guide portion 17a is located in the second card receiving portion 13b.

The base plate 13 is provided with first and second stopper portions 45 and 46 for fixing the first guide portion 17a. When an end portion of the first guide portion 17a is engaged with the first stopper portion 45 as depicted by a solid line in FIG. 1, the first guide portion 17a is fixed to be aligned with the second guide portion 17b in a single straight line. When the end portion of the first guide portion 17a is engaged with the second stopper portion 46 as depicted by a dot-and-dash line in FIG. 1, the first guide portion 17a is fixed to be perpendicular to the second guide portion 17b.

In the uninserted state mentioned above, the first guide portion 17a is engaged with the first stopper portion 45. Therefore, the card 31 partly inserted into the second card receiving portion 13b is engaged with the first guide portion 17a and inhibited from further insertion. Thus, the card 31 can be inserted only into the first card receiving portion 13a.

When the card 31 is inserted into the first card receiving portion 13a, the second guide portion 17b is pressed by the card 31 and rotated in the second direction B against tension coil spring 49. As a consequence, the guiding member 17 is parallel to the first direction A so that the card 31 can be inserted into the second card receiving portion 13b. Therefore, two cards same in shape and size can be fitted as illustrated in FIG. 2.

The guide frames 11 have inward surfaces faced to each other and provided with frame guide grooves 11a for guiding insertion and removal of the cards 31, respectively. The guiding member 17 is provided with a pair of guide grooves 17d for guiding removal of the cards 31. It is noted here that, when a first card 31 is inserted into the first card receiving portion 13a, one of the guide grooves 17d of the guiding member 17 serves to guide insertion of a second card 31 into the second card receiving portion 13b.

As described above, unless the first card 31 is inserted into the first card receiving portion 13a, the second card 31 can not be inserted into the second card receiving portion 13b. Thus, the first and the second card receiving portions 13a and 13b are given degrees of priority by the guiding member 17.

Next referring to FIGS. 5 through 12, description will be made of operation of fitting the cards 31 into the card fitting mechanism.

Figure 5:
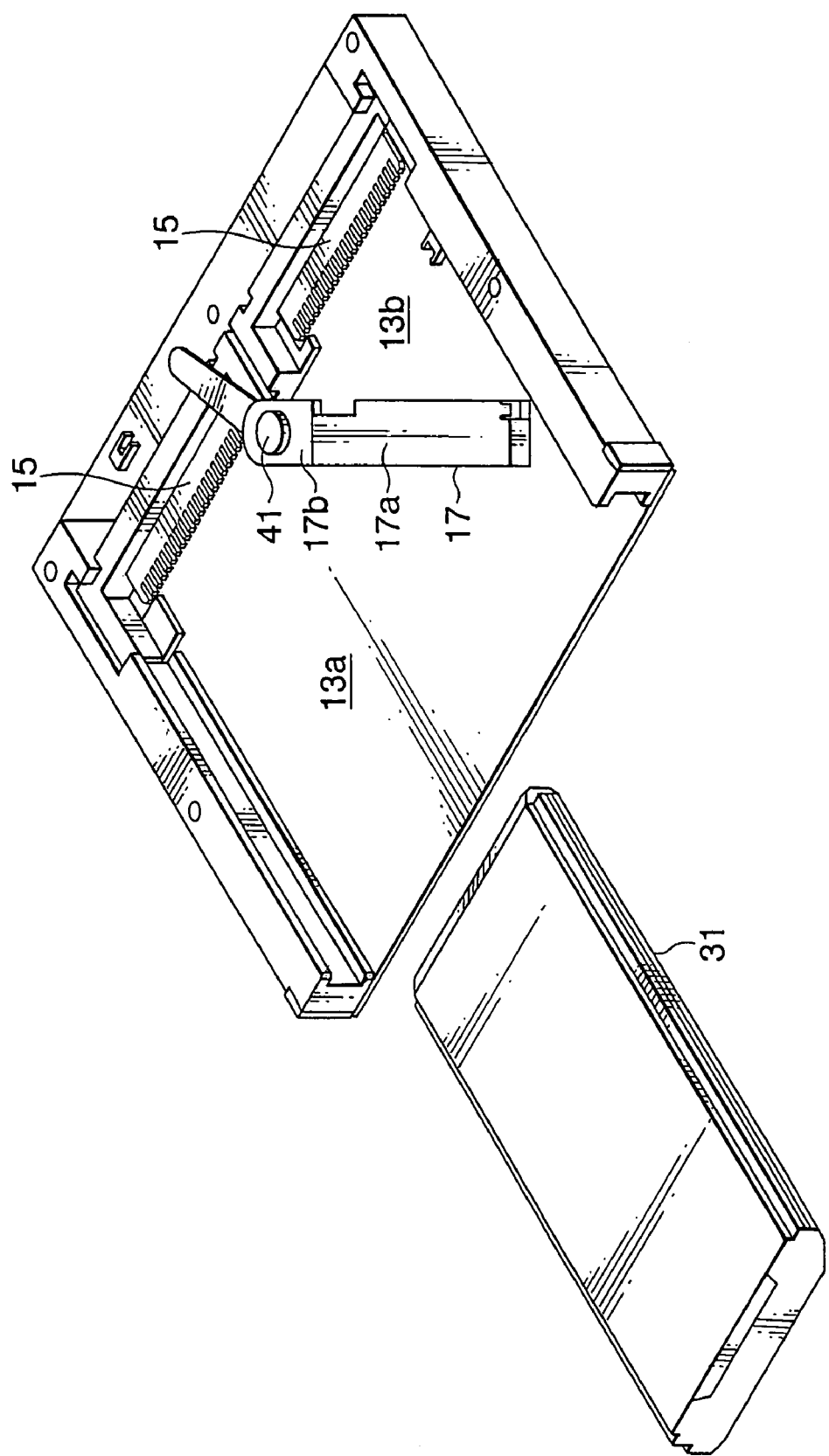
FIG. 5 is a perspective view of the card fitting mechanism in FIG. 1 before a first card is inserted therein.
Figure 6:
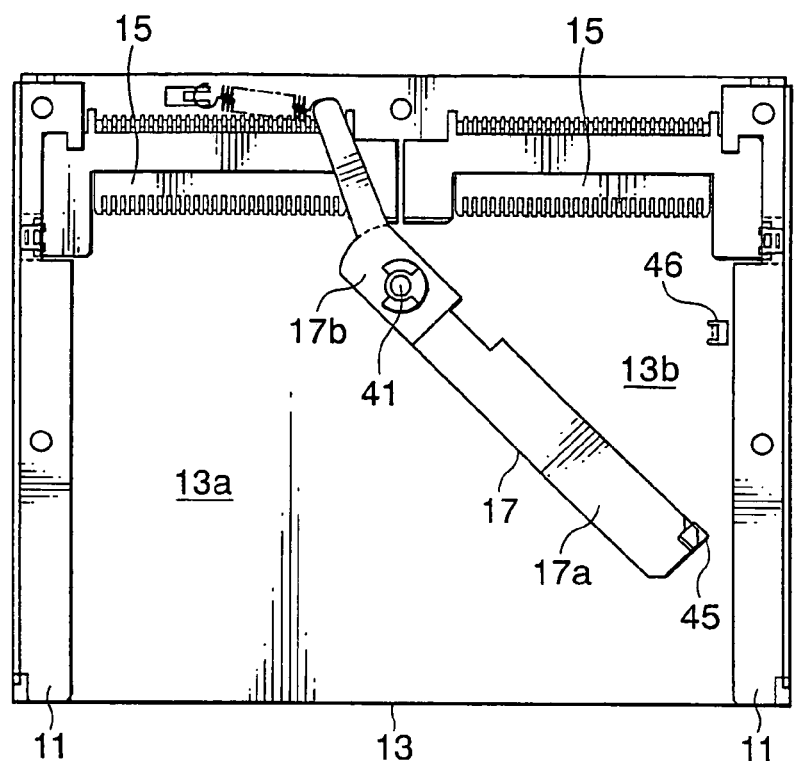
FIG. 6 is a plan view of the card fitting mechanism in FIG. 1 before the first card is inserted therein.

When the cards 31 are not inserted into the first and the second card receiving portions 13a and 13b as shown in FIGS. 1, 5, and 6, the guiding member 17 is rotated in the third direction C and rests in an opened state.

Figure 7:
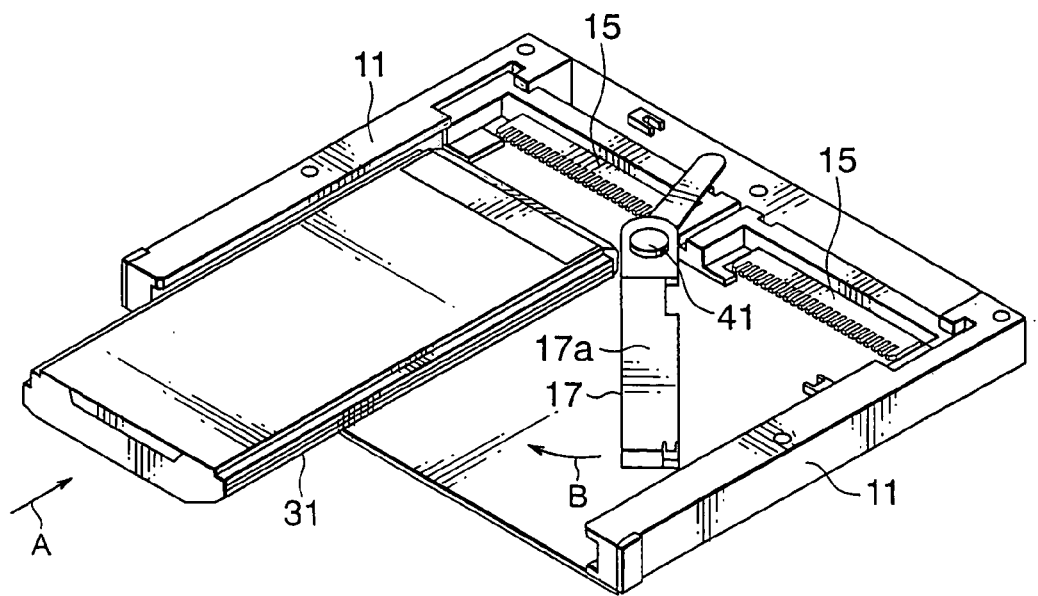
FIG. 7 is a perspective view of the card fitting mechanism in FIG. 6 when the first card is partly inserted.
Figure 8:
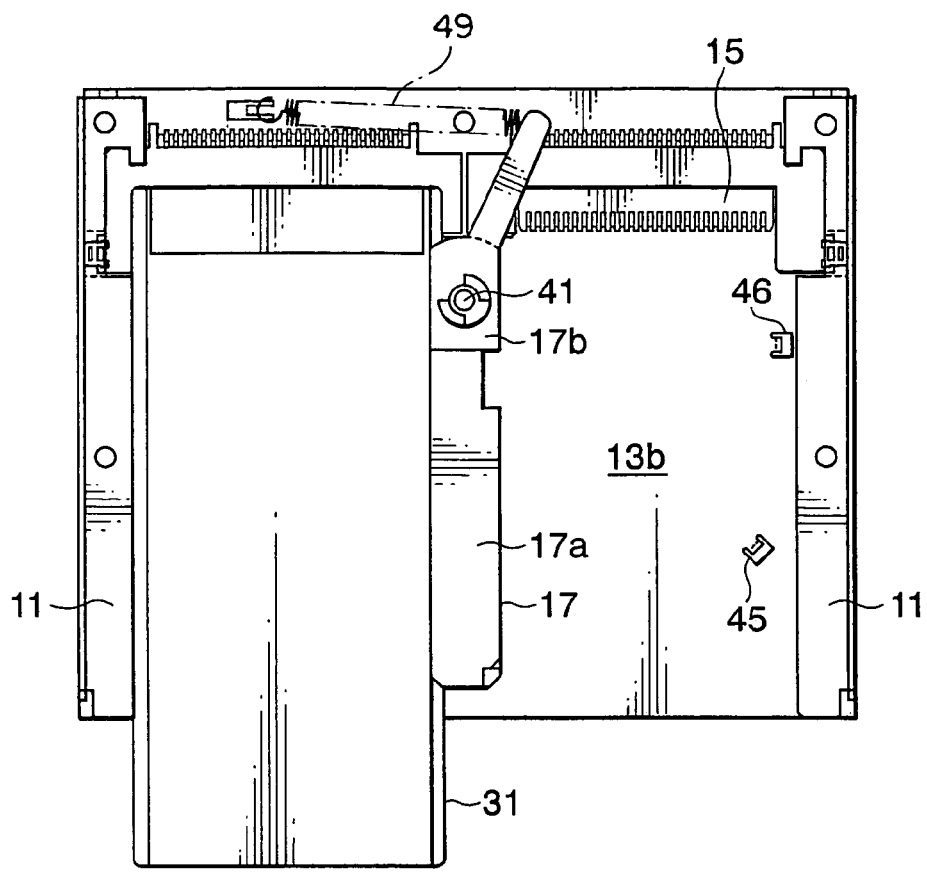
FIG. 8 is a plan view of the card fitting mechanism in FIG. 7 after the first card is inserted therein.

When the first card 31 is inserted into the first card receiving portion 13a, an inserting end of the first card 31 is brought into contact with an inner or rear side of the second guide portion 17b as illustrated in FIG. 7. When the first card 31 is further inserted, the second guide portion 17b is pressed by the first card 31 to rotate around the shaft portion 41 together with the first guide portion 17a. When the first card 31 is still further inserted, the guiding member 17 is rotated until the guiding member 17 is located in parallel to the guide frames 11 as illustrated in FIG. 8. In this state, the card-side contacting portions of the first card 31 are contacted with the contacts 21 of the connector 15, respectively.

Figure 9:
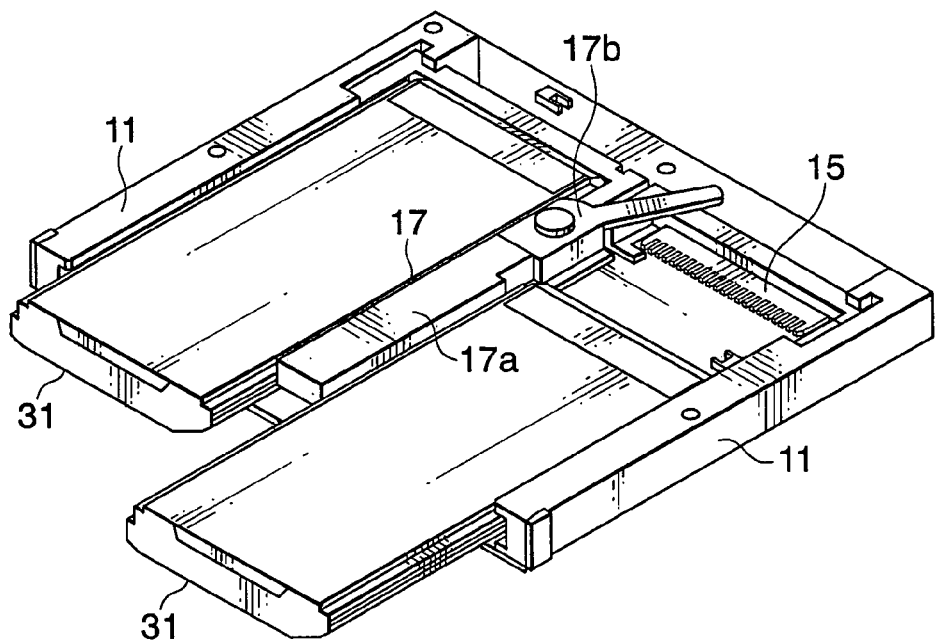
FIG. 9 is a perspective view of the card fitting mechanism in FIG. 8 when a second card is partly inserted after the first card is inserted.

Thereafter, the second card 31 is inserted into the second card receiving portion 13b as illustrated in FIG. 9. At this time, the second card 31 is guided by the frame guide groove 11a of one of the guide frames 11 and one of the guide grooves 17d of the guiding member 17. Thus, the card contacting portions of the second card 31 are contacted with the contacts 21 of the connector.

Figure 10:
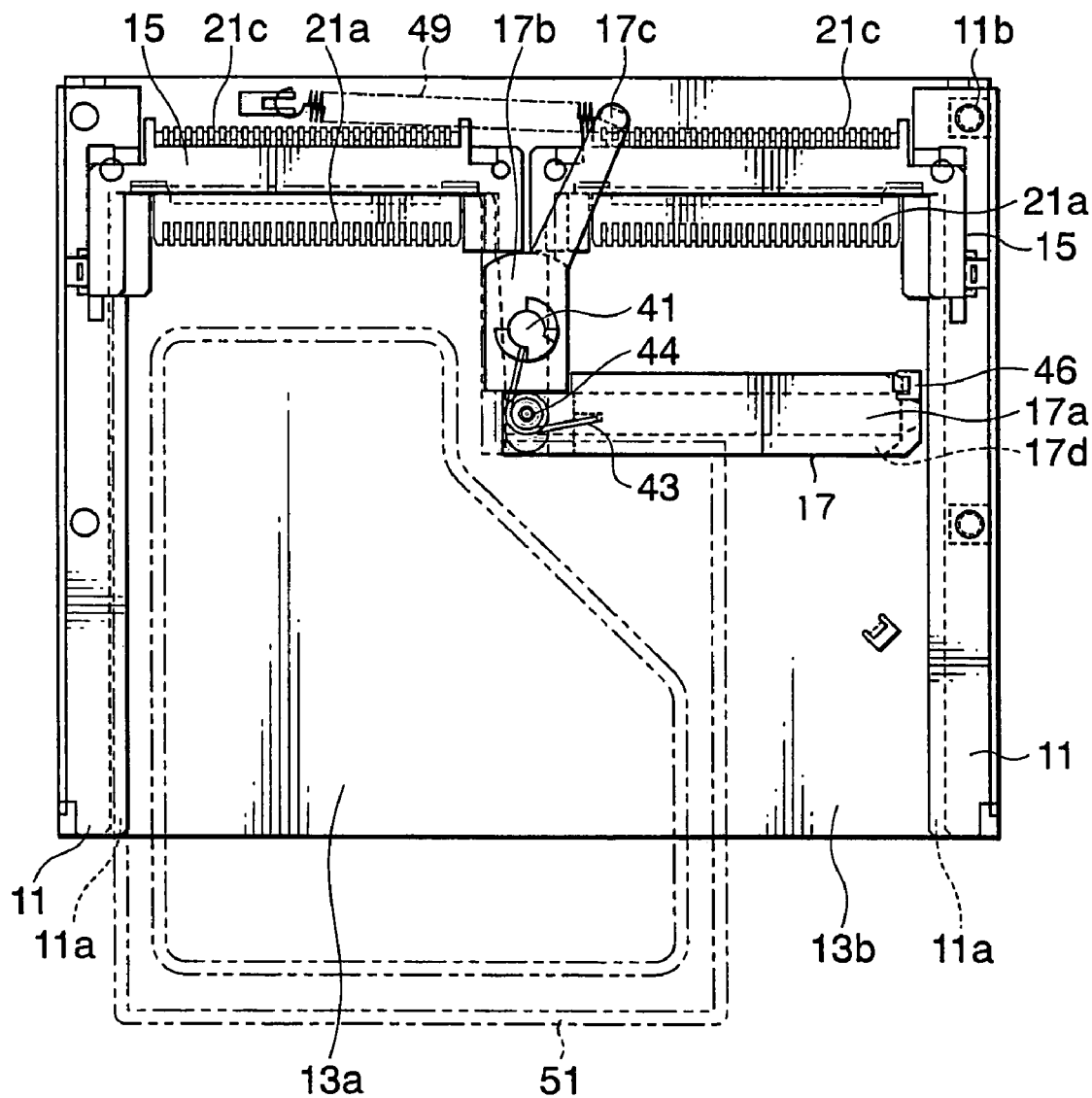
FIG. 10 is a plan view of the card fitting mechanism in FIG. 1 after a card of a different shape is inserted therein.

Referring to FIG. 10, a card 51 of an irregular shape may be inserted.

Figure 11:
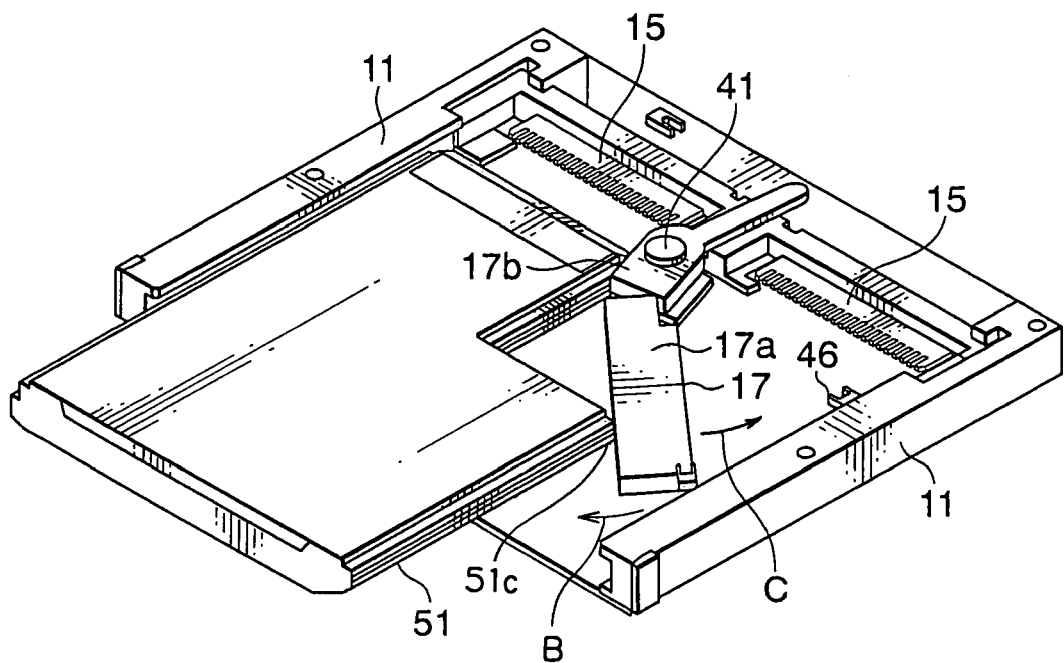
FIG. 11 is a plan view of the card fitting mechanism in FIG. 10 when the card of the different shape is partly inserted.
Figure 12:
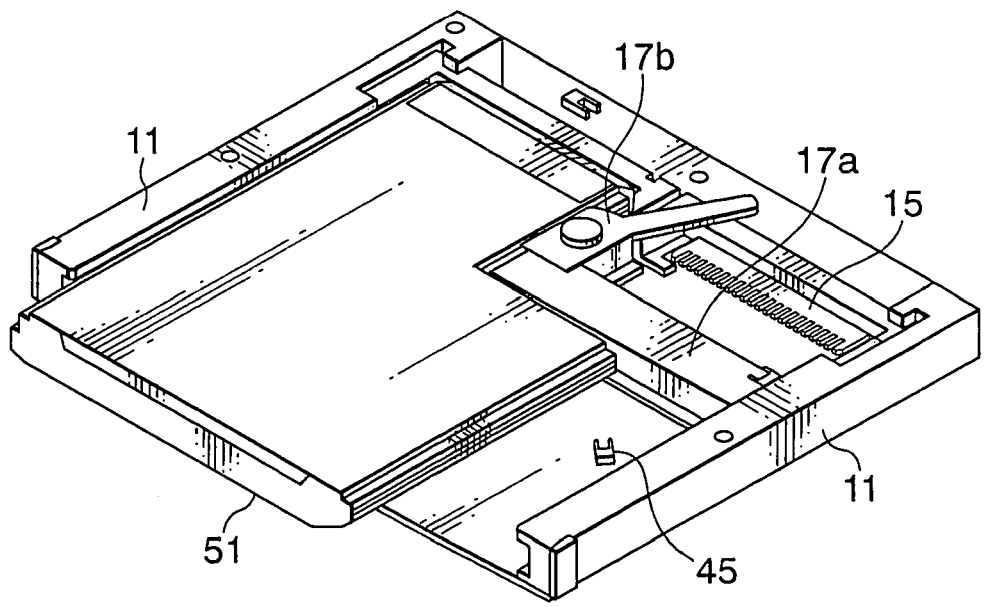
FIG. 12 is a perspective view of the card fitting mechanism in FIG. 11 after the card of the different shape is inserted therein.

When the card 51 is inserted, the first guide portion 17a is rotated along the shape of the card 51. When the card 51 is inserted, an end of the card 51 is brought into contact with the second guide portion 17b as illustrated in FIG. 11. The second guide portion 17b starts rotation in the second direction B. Simultaneously, the first guide portion 17a is dragged by the second guide portion 17b. As a consequence, the first guide portion 17a is released from engagement by the first stopper portion 45. Thereafter, a step portion 51c on an outer contour of the card 51 is brought into contact with the first guide portion 17a. The first guide portion 17a is rotated in the third direction C against urging force of the spring member 43 to be engaged with the second stopper portion 46. Finally, the guiding member 17 takes a form along the outer contour of the card 51 as illustrated in FIG. 12. As described above, even if the card 51 has such an irregular shape, the guiding member 17 is bent in conformity with the shape of the card 51 so as to allow the card 51 to be fitted.

Further, after the card 31 or 51 is removed, the guiding member 17 returns to its initial position under the action of the tension coil spring 49 and the spring member 43. Thus, whether the card 31 or 51 is used, the guiding member 17 is returned to the uninserted state under the restoring force of the tension coil spring 49 and the spring member 43 after the card 31 or 51 is removed.

In the foregoing embodiment, the guide frames are formed on the base plate 13. Alternatively, the guide frames and the base plate 13 may be reversed in position in a vertical direction. The card fitting mechanism mentioned above is applicable to various apparatuses, such as a PDA (Personal Digital Assistant) or a mobile telephone, adapted to use a SD (Secure Digital) memory card, a memory stick, a disk card, or the like as a memory.

While the present invention has thus far been described in conjunction with the preferred embodiment thereof, it will be readily possible for those skilled in the art to put the present invention into practice in various other manners without departing from the scope of the present invention. For example, although the description is made about the card fitting mechanism having two card receiving portions, the card fitting mechanism may be designed to have three or more card receiving portions. In this case, it is a matter of course that the guiding member is disposed each between adjacent ones of the card receiving portions.

What is claimed is:

1. A card fitting mechanism for receiving a card fitted thereto, said card fitting mechanism comprising:
    plurality of card receiving portions arranged parallel to one another, each of said card receiving portions being adapted to receive said card; and
    guiding member disposed between adjacent ones of said card receiving portions so as to enter into adjacent ones of said card receiving portions, said guiding member being moved by insertion of said card into only one of said adjacent ones to serve as a guide for guiding insertion of said card into another of said adjacent ones, said first guiding member having a first guide portion and a second guide portion rotatable with respect to said first guide portion.

2. The card fitting mechanism according to claim 1, further comprising:
    a base plate defining said card receiving portions;
    a shaft portion perpendicular to said base plate and rotatably supporting said second guide portion on said base plate;
    a connecting shaft portion parallel to said shaft portion and rotatably connecting said first guide portion to said second guide portion;
    a spring member urging said first and said second guide portions so that a predetermined angle is maintained therebetween; and
    another spring member urging said guiding member to make said first guide portion enter into one of adjacent ones of said card receiving portion.

3. The card fitting mechanism according to claim 2, further comprising a pair of guide frames disposed on said base plate with a space kept therebetween, said guide frames defining opposite ends of an array of said receiving portions.

4. A card fitting mechanism for receiving a card fitted thereto, said card fitting mechanism comprising:
    a plurality of card receiving portions arranged parallel to one another, each of said card receiving portions being adapted to receive said card;
    a guiding member disposed between adjacent ones of said card receiving portions so as to enter into adjacent ones of said card receiving portions, said guiding member being moved by insertion of said card into only one of said adjacent ones to serve as a guide for guiding insertion of said card into another of said adjacent ones; and
    a spring member urging said guiding member in one direction.

5. The card fitting mechanism according to claim 4, wherein said guiding member comprises:
    an assembly composed of a plurality of parts connected to one another; and
    a spring member urging said assembly so that said parts are arranged along a single straight line.

6. A card fitting mechanism for receiving a card fitted thereto, said card fitting mechanism comprising:
    a plurality of card receiving portions arranged parallel to one another, each of said card receiving portions being adapted to receive said card;
    a guiding member disposed between adjacent ones of said card receiving portions so as to enter into adjacent ones of said card receiving portions, said guiding member being moved by insertion of said card into only one of said adjacent ones to serve as a guide for guiding insertion of said card into another of said adjacent ones; and
    a shaft portion rotatably supporting said guiding member, said guiding member having a first part and a second art, said first part being located on one side of said shaft portion and entering into one of adjacent ones of said card receiving portions, said second part being located on the other side of said shaft portion and entering into the other of adjacent ones of said card receiving portion.

7. The card fitting mechanism according to claim 6, further comprising a stopper for engaging said second part.

* * * * *

UNITED STATES PATENT AND TRADEMARK OFFICE
CERTIFICATE OF CORRECTION

PATENT NO. : 7,108,530 B2 Page 1 of 1
APPLICATION NO. : 10/930396
DATED : September 19, 2006
INVENTOR(S) : Kimura et al.

It is certified that error appears in the above-identified patent and that said Letters Patent is hereby corrected as shown below:

In particular:
In Column 5, line 23, (Line 3 of Claim 1) before the word "plurality", please insert: --a--.
In Column 5, line 26 (Line 6 of Claim 1), before the word "guiding", please insert: --a--.
In Column 6, Line 40 (Line 15 of Claim 6) please change "art" to correctly read: --part--.

Signed and Sealed this

Second Day of January, 2007

JON W. DUDAS
*Director of the United States Patent and Trademark Office*